United States Patent [19]

Reise

[11] Patent Number: 5,566,746

[45] Date of Patent: Oct. 22, 1996

[54] OIL COOLING APPARATUS

[76] Inventor: Anthony E. Reise, 17 Thurston Ave., Portsmouth, R.I. 02871

[21] Appl. No.: 335,094

[22] Filed: Nov. 7, 1994

[51] Int. Cl.$^6$ ....................................................... F01P 11/08
[52] U.S. Cl. .............................. 165/41; 165/44; 180/229; 184/104.3
[58] Field of Search ........................ 165/41, 44; 180/229; 184/104.3

[56] References Cited

U.S. PATENT DOCUMENTS

| | | | |
|---|---|---|---|
| 1,318,706 | 10/1919 | Talbot | 184/104.3 |
| 4,478,306 | 10/1984 | Tagami | 165/41 |
| 4,640,341 | 2/1987 | Ozawa | 165/41 |
| 5,307,865 | 5/1994 | Inagaki et al. | 165/41 |

FOREIGN PATENT DOCUMENTS

| | | | |
|---|---|---|---|
| 0005424 | 1/1980 | Japan | 165/41 |
| 0217793 | 8/1990 | Japan | 165/44 |

*Primary Examiner*—Edward K. Look
*Assistant Examiner*—Mark Sgantzos
*Attorney, Agent, or Firm*—Salter & Michaelson

[57] ABSTRACT

An oil cooling apparatus for cooling oil contained in a motorcycle engine of a motorcycle includes a housing having a front wall, a bottom wall extending rearwardly from the front wall, and a pair of spaced apart side walls which attach respective sides of the front and bottom walls. The housing further includes an opening for accessing the interior of the housing, a plurality of inlet louvers formed in the front wall and a plurality of outlet louvers formed in the bottom wall. The arrangement is such that air enters the interior of the housing via the inlet louvers and exits the interior of the housing via the outlet louvers. A bracket mounts the housing on an engine of a motorcycle in a position such that the opening of the housing generally faces the engine. A radiator contained within the engine of the motorcycle is provided for cooling the motorcycle's engine. Tubing, in fluid communication with the engine whereby oil flows therethrough, is disposed within the radiator. Air circulates within the interior of the housing around the radiator for removing heat from the radiator thereby cooling the oil flowing through the tubing.

18 Claims, 4 Drawing Sheets

OIL COOLING APPARATUS

SUMMARY OF THE INVENTION

This invention relates generally to cooling systems, and more particularly to an oil cooling apparatus for a motorcycle.

Motorcycles manufactured with larger cubic inch engines, or modified to have larger cubic inch engines, are often subject to overheating. This may be caused by the larger area in the combustion chamber of the engine, the increased compression ratio of the engine pistons, valve timing of the engine cams, and/or the lack of adequate air flow over the engine heads. Because engines of this type are often designed with air cooling fins on the engine heads and cylinders, they are intended to be cooled via air flow when the motorcycle is in motion. It has been found that in many instances the air cooling fins on the heads and cylinders on the engine may not adequately cool the motorcycles's engine.

One solution for preventing overheating and proper lubrication of the engine has been to mount an oil cooling apparatus on the motorcycle's frame for cooling the oil circulating within the engine. A typical prior art oil cooling apparatus has a relatively large radiator which is mounted on the frame of the motorcycle adjacent the junction of the handlebars and the main body frame which is not a location conducive to air flow over the cooling system. These cooling apparatuses are typically small and inadequate in properly cooling the engine's oil. A pair of hoses attached to the underside of the engine provide fluid communication between the radiator and the engine in which oil circulates from the engine, through the radiator and back to the engine. These hoses are fully exposed at the front of the motorcycle's engine. The oil cooling apparatus is mounted on the motorcycle's frame by two small clamping brackets which are subject to loosening and cracking during use.

Another significant disadvantage associated with such a prior art oil cooling apparatus is that it detracts from the overall look of the motorcycle since the radiator and hoses are exposed at the front of the motorcycle. There is presently a need for a motorcycle oil cooling apparatus which effectively cools the oil circulating in the motorcycle's engine and prevents its overheating while providing a neat, clean and unobtrusive look.

Among the several objects of the present invention are the provision of an improved oil cooling apparatus for a motorcycle which maximizes oil cooling; the provision of such an oil cooling apparatus which increases oil capacity of the motorcycle's engine and decreases the likelihood of oil viscosity breakdown; the provision of such an oil cooling apparatus which is effective in cooling the oil circulating in the motorcycle's engine; the provision of such an oil cooling apparatus which is stylistic in design and mounted on the motorcycle in a location which is unobtrusive; the provision of such an oil cooling apparatus which is especially suited for retrofitting a motorcycle therewith; and the provision of such an oil cooling apparatus which is cost-efficient to manufacture and is easily mounted on a motorcycle.

In general, the invention is directed to an oil cooling apparatus for cooling oil contained in a motorcycle engine of a motorcycle. The apparatus comprises a housing having a front wall, a bottom wall extending rearwardly from the front wall, and a pair of spaced apart side walls which attach respective sides of the front and bottom walls. The housing further has an opening for accessing the interior of the housing, a plurality of inlet louvers formed in the front wall and a plurality of outlet louvers formed in the bottom wall. The arrangement is such that air enters the interior of the housing via the inlet louvers and exits the interior of the housing via the outlet louvers. Means mounts the housing on an engine of a motorcycle in a position such that the opening of the housing generally faces the engine. Means cools oil contained within the engine of the motorcycle, the means comprising tubing in fluid communication with the engine whereby oil flows therethrough, and radiator means, disposed within the housing, for removing heat from the tubing. Air is adapted to circulate within the interior of the housing around the radiator means for removing heat from the radiator means thereby cooling the oil flowing through the tubing.

Other objects, features and advantages of the invention shall become apparent as the description thereof proceeds when considered in connection with the accompanying illustrative drawings.

BRIEF DESCRIPTION OF THE DRAWINGS

Corresponding references designate corresponding parts throughout the several views of the drawings.

DETAILED DESCRIPTION OF THE PREFERRED EMBODIMENT

Figure 1:
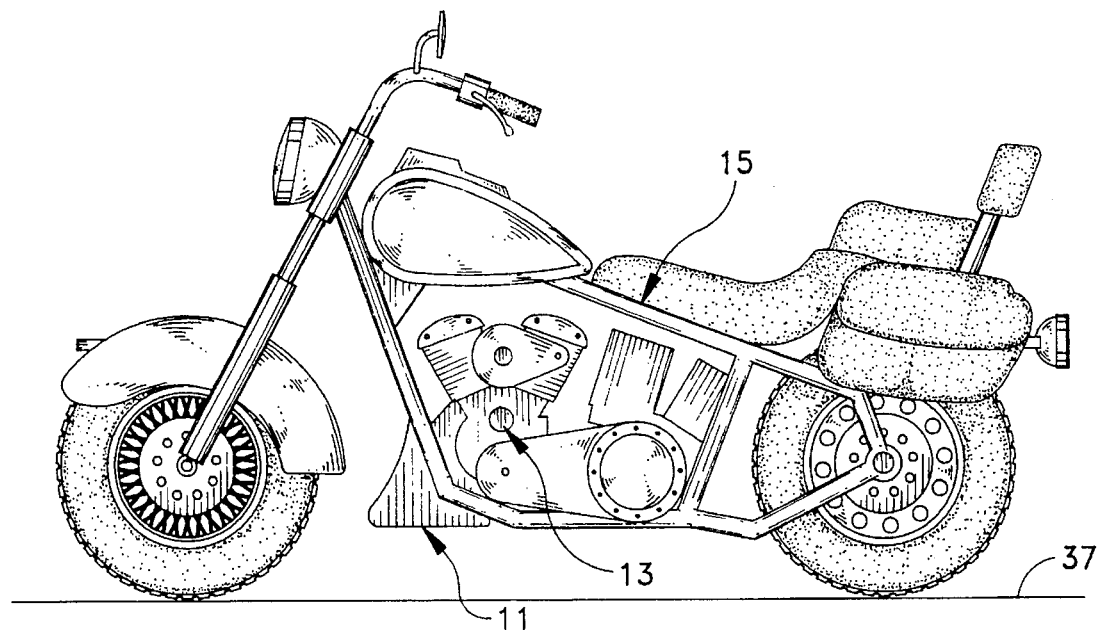
FIG. 1 is a perspective view of an oil cooling apparatus of the present invention mounted on a motorcycle.
Figure 2:
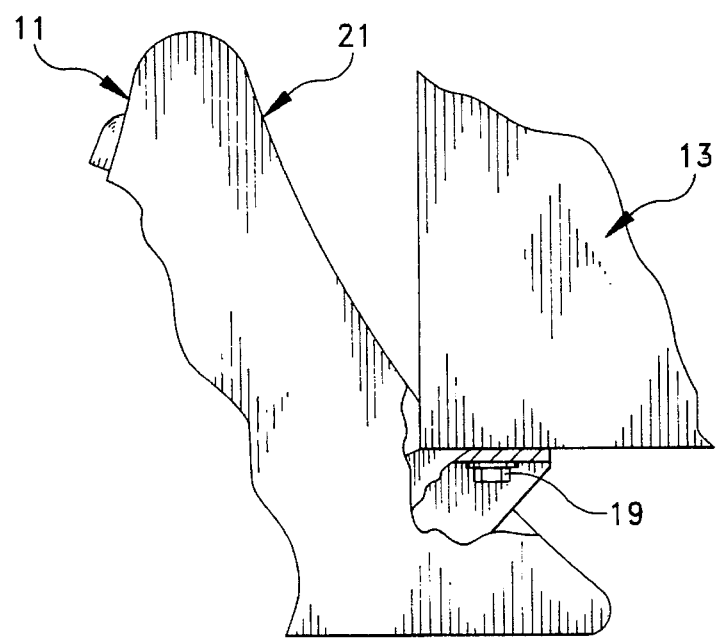
FIG. 2 is an enlarged side elevation view showing the mounting of the oil cooling apparatus on an engine of the motorcycle.
Figure 3:
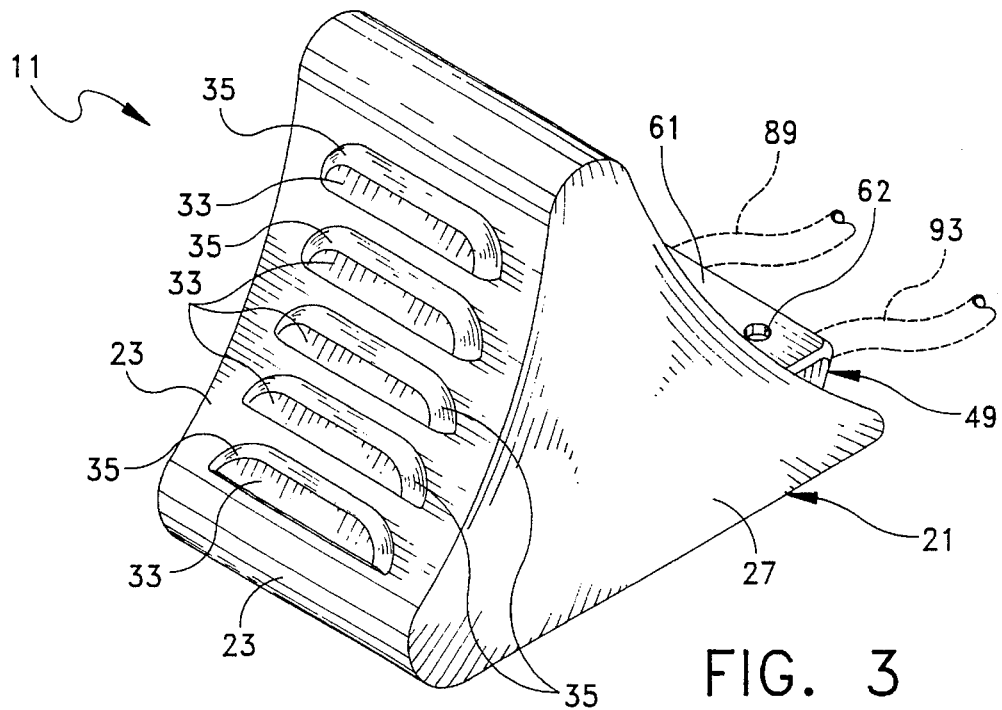
FIG. 3 is a front perspective view of the oil cooling apparatus.

Referring to the drawings, and more particularly to FIGS. 1 and 2, there is generally indicated at 11 an oil cooling apparatus of the present invention for cooling oil which circulates in an engine 13 of a motorcycle generally indicated at 15. The oil cooling apparatus 11 is mounted on the engine 13 of the motorcycle 15 by a pair of bolts 19 (only one bolt 19 being illustrated in FIG. 2) to the underside of the motorcycle's engine 13, the oil cooling apparatus 11 extending forwardly with respect to the engine 13. It should be understood that the apparatus 11 may be mounted on the engine 13 by any suitable means so long as the apparatus is secure. It should also be understood that the apparatus 11 may be mounted on the motorcycle's frame.

Figure 5:
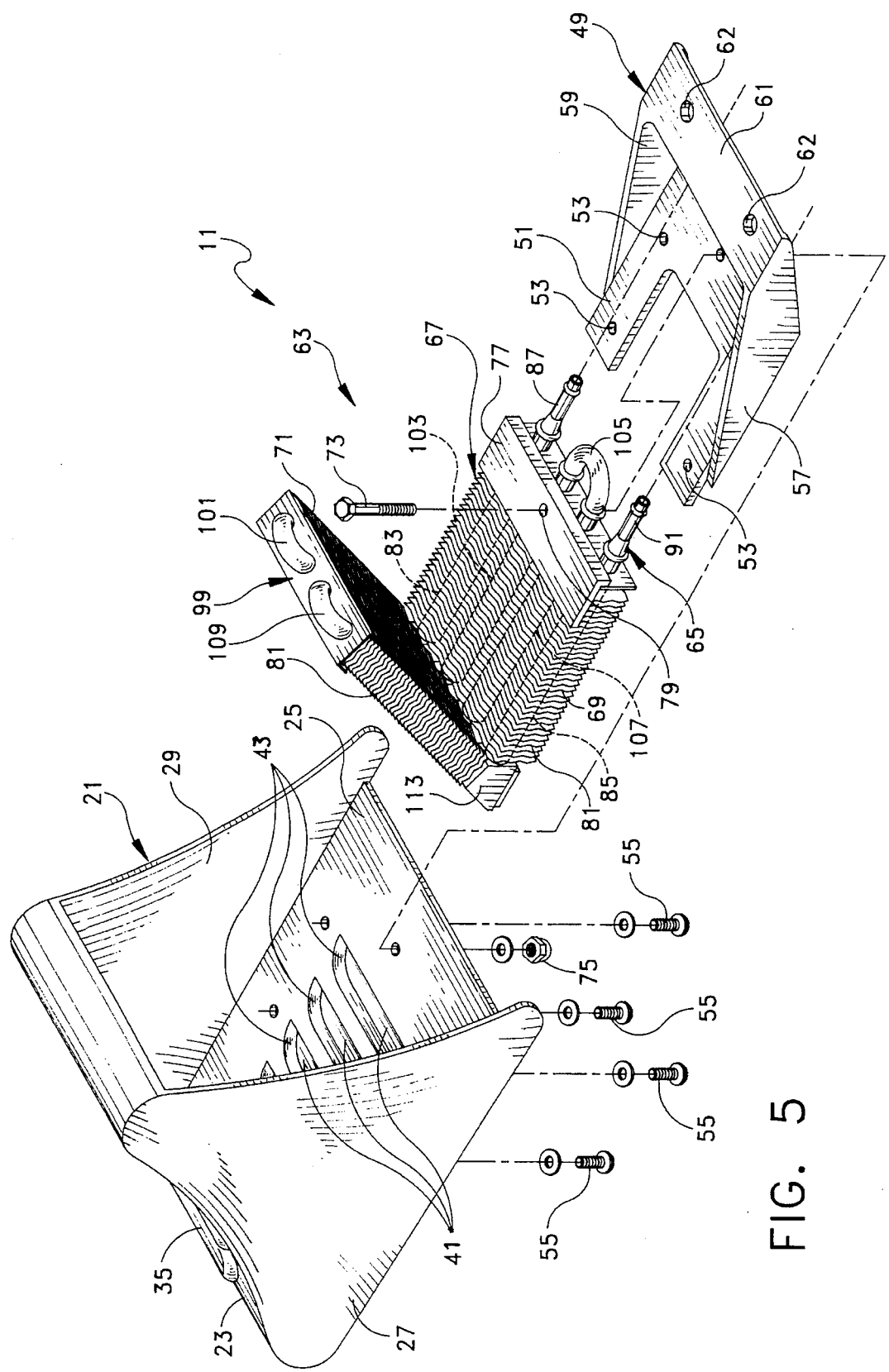
FIG. 5 is an exploded rear perspective view showing a housing, radiator means and a bracket for mounting the radiator means on the housing and for mounting the apparatus on the frame of the motorcycle.
Figure 6:
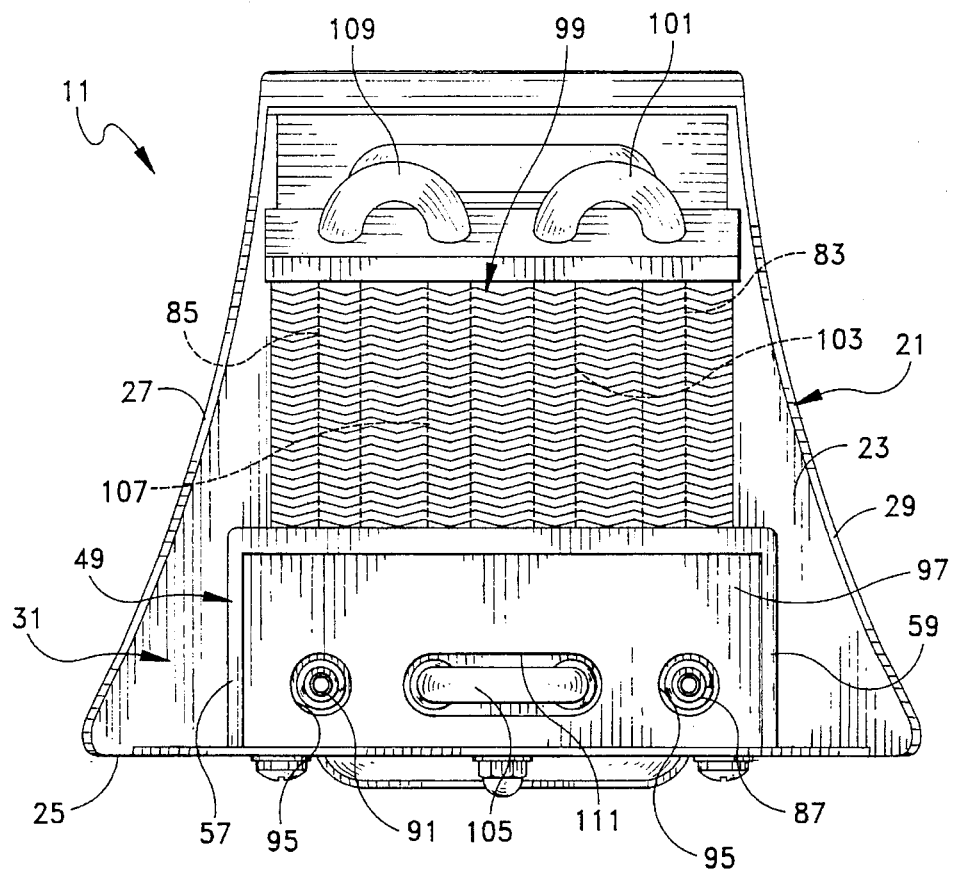
FIG. 6 is a rear elevation view of the oil cooling apparatus.
Figure 7:
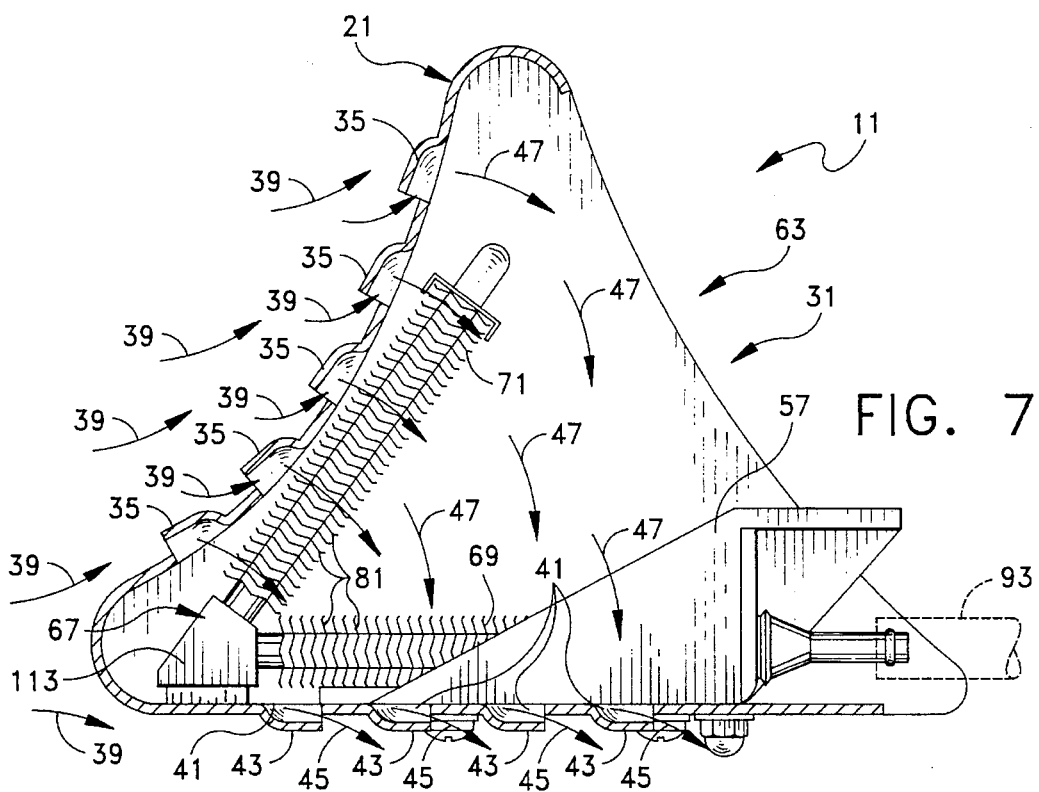
FIG. 7 is a partial cross-sectional view thereof.

As illustrated in FIGS. 3–7, the oil cooling apparatus 11 comprises a housing, generally indicated at 21, for protecting the oil cooling system 11 against damage caused by foreign objects on the road. The housing includes a front wall 23, a bottom wall 25 extending rearwardly from and at an angle with respect to the front wall 23, and a pair of spaced apart side walls 27, 29 which attach respective sides of the front and bottom walls 23, 25. The front wall 23 is at an acute angle (e.g., 56°) with respect to the bottom wall 25. As illustrated in FIG. 7, the housing 21 is generally triangular-shaped as viewed from the side. The housing 21 is preferably fabricated from sheet metal, such as aluminum (e.g., 5052 aluminum alloy) or stainless steel, and may be coated on its exterior with a number of products, such as chrome plating or paint. The housing 21 further includes an opening generally indicated at 31 for accessing the interior of the housing 21.

Provided in the front wall 23 of the housing 21 are a plurality of inlet openings or louvers, each indicated at 33, formed therein which allow air to enter the interior of the housing 21. Adjacent to each inlet louvers 33 is means for directing air into the interior of the housing 21 comprising an inlet flap, each indicated 35, located above its respected louver 33. Each inlet flap 35 not only directs air into the interior of the housing 21 but also allows moisture (e.g., fallen rain) to enter the interior of the housing for further cooling. As illustrated in the drawings, the inlet flaps 35 are generally at an angle with respect to the roadway 37 so that air flows up through the inlet louvers 33 and circulates within the housing 21. In FIG. 7, arrows 39 indicate the flow of air as it enters into the inlet louvers 33.

Similarly, provided in the bottom wall 25 of the housing 21 are a plurality of outlet louvers, each indicated 41, formed therein which allow air to exit the interior of the housing 21. Adjacent to each outlet louvers 41 is means for directing air out of the interior of the housing 21 comprising an outlet flap 43 located above its respected louver 41. Each outlet flap 43 channels air out of the interior of the housing 21 and also allows some moisture to enter within the interior from below the housing 21 (e.g., moisture on the roadway). As illustrated, in the outlet flaps 43 are generally parallel to the roadway 37. Arrows 45 indicate the flow of air out of the outlet louvers 41.

As illustrated in FIG. 7, the inlet and outlet louvers 33, 41 create an air flow within the interior of the housing 21 which is represented by arrows 47. This air flow contributes significantly to the ability of the oil cooling system 11 to effectively cool the motorcycle's engine oil, which will be discussed in greater detail below.

Means for mounting the housing on the motorcycle's engine 13 embodies a generally U-shaped bracket (as viewed from above), generally indicated at 49, which is mounted on the interior surface of the bottom wall. Referring to FIG. 5, the U-shaped bracket includes a flat, bottom portion 51 having four threaded openings (each indicated 53) formed therein for receiving bolts 55 which secure the U-shaped bracket 49 to the bottom wall 25 of the housing 21 through openings (not designated provided in the bottom wall. A pair of side portions 57, 59 extend upwardly from the bottom portion 51 and terminate at a top portion which is designated 61. The top portion 61 includes a pair of openings 62 formed therein which receive bolts 19 (FIG. 2) for mounting the U-shaped bracket 49 to the engine 13. The U-shaped bracket 49 and bolts 19 mount the housing 21 on the engine 13 in a position such that the housing 21 is adjacent the engine 13 with the opening 31 of the housing 21 generally facing the engine 13. As illustrated in FIGS. 1 and 2, the oil cooling system 11 of the present invention is mounted on the engine 13 such that the bottom wall 25 of the housing 21 is generally parallel to the roadway 37 and proximately spaced therefrom. In sharp contrast, prior cooling apparatuses have been mounted on the frame of the motorcycle adjacent the junction of the handlebars and the main body frame.

Figure 4:
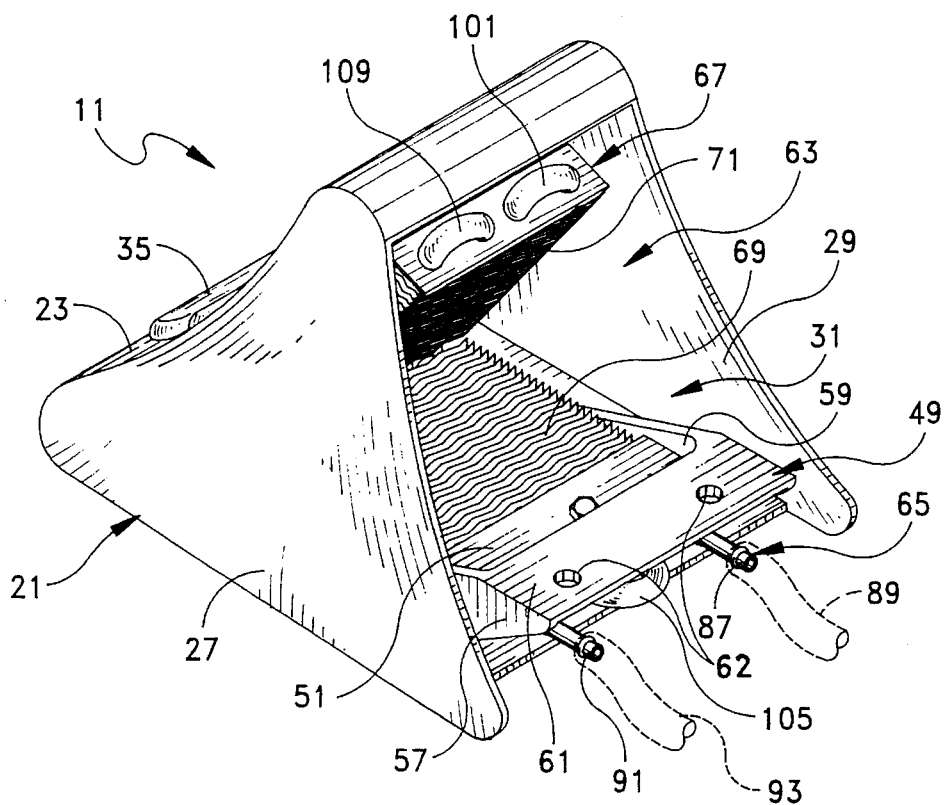
FIG. 4 is a rear perspective view thereof.

Referring still to FIGS. 3–7, the oil cooling apparatus 11 further comprises means, generally indicated at 63, for cooling oil which circulates within the motorcycle's engine. Means 63 comprises copper tubing, generally indicated at 65, in fluid communication with the engine, and radiator means, generally indicated at 67, comprising first and second radiators 69, 71 disposed within the interior of the housing 21. As illustrated in FIG. 4, the first radiator 69 is mounted on the bottom wall 25 of the housing 21 by the U-shaped bracket 49 such that the first radiator 69 lies generally along the same plane as the bottom wall 25. FIG. 5 illustrates the first radiator 69 being secured to the housing 25 by a bolt 73 in a position such that the first radiator 69 rests upon the bottom portion 51 of the U-shaped bracket 49. A nut 75 (FIG. 5) secures the end of the bolt 73 to the bottom wall 25 of the housing 21. The first radiator 69 includes a sheet metal plate 77 having an opening 79 formed therein, the plate 77 extending across the top edge of the radiator 69. The opening 79 receives the bolt 73 therethrough for clamping the first radiator 69 between the plate 77 and the bottom portion 51 of the U-shaped bracket 49. The second radiator 71 extends from the first radiator 69 in a plane generally along the same plane as the front wall 23 of the housing 21, i.e., it is at a 56° angle with respect to the first radiator 69. As illustrated in FIG. 7, the second radiator 71 extends freely from the first radiator 69 and is not secured to the housing 21.

The first and second radiators 69, 71 each have a series of heat dissipating fins 81 in contact with the tubing 65 for dissipating heat from the tubing. The fins 81 dissipate heat from the tubing 65 as air flows within the interior of the housing 21 from the inlet louvers 33 and out of the outlet louvers 41. The fins are preferably fabricated from sheet metal material (e.g. aluminum) having heat-conductive properties.

The tubing 65 is disposed within the first and second radiators 69, 71 such that an inlet portion 83 of the tubing 65 extends from the first radiator 69 to the second radiator 71 and an outlet portion 85 of the tubing 65 extends from the second radiator 71 to the first radiator 69. The tubing 65 further comprises an inlet fitting 87 at the end of the inlet portion 83 for connecting the inlet portion 83 of the tubing 65 to a relatively short outlet hose 89 of the engine. An outlet fitting 91 at the end of the outlet portion 85 connects the outlet portion 85 of the tubing 65 to a relatively short inlet hose 93 of the engine. It is to be understood that the inlet and outlet fittings and portions could be reversed and still fall within the scope of the present invention. As illustrated in FIG. 6, the inlet and outlet fittings 87, 91 extend through openings 95 formed in a vertical web portion 97 of the U-shaped bracket 49. The inlet and outlet fittings 87, 91 are attached to their respective inlet and outlet portions 83, 85 by any suitable method which is well known in the art.

The tubing 65 also comprises a loop of tubing generally indicated at 99 for increasing the length of the tubing 65 thereby enabling the first and second radiators 69, 71 to dissipate a greater amount of heat from the tubing. The loop of tubing 99 is in fluid communication with and disposed between the inlet and outlet portions 83, 85. A first U-shaped fitting 101 connects the inlet portion 83 with a first section 103 of the loop of tubing 99 which extends from the second radiator 71 to the first radiator 69. A second U-shaped fitting 105 connects the first section 103 of the loop of tubing 99 to a second section 107 of the loop of tubing which extends from the first radiator 69 to the second radiator 71. A third U-shaped fitting, indicated at 109, connects the second section 107 of the loop of tubing 99 to the outlet portion 85 of the tubing 65. As illustrated in FIG. 6, the second fitting 105 extends through an elongate opening 111 formed in the vertical web portion 97 of the U-shaped bracket 49. The attachment of the U-shaped fittings 101, 105 and 109 to their respective section 103, 107 or portion 83, 85 may be accomplished by any suitable method which is well known in the art.

The inlet portion 83, outlet portion 85, first section 103 and second section 107 of the tubing 65 are bent at the junction of the first radiator 69 and the second radiator 71. Provided at the junctions of these tubular portions and sections are thermal blocks, each indicated 113, which dissipate heat from the tubing 65 and stabilize the second radiator 71 with respect to the first radiator 69. Preferably, these blocks 113 are fabricated from solid metal material, such as aluminum or stainless steel. As mentioned above, the four blocks 113 strengthen the connection of the second radiator 71 to the first radiator 69 and prevent the movement of the second radiator 71 with respect to the first radiator 69. The blocks 113 are fitted onto their respective tubing portions 83, 85 and sections 103, 107 by welding or any other suitable method.

In operation, as the motorcycle 15 is moving, air flows through the inlet louvers 33 (see arrows 39) into the interior of the housing 21. The air circulates within the housing 21 (see arrows 47) and is then drawn out of the interior of the housing 21 (see arrows 45) through the outlet louvers 41 thereby producing an air flow within the interior of the housing 21. Oil from the motorcycle's engine 13 circulates from the engine to the first and second radiators 69, 71 of the oil cooling apparatus 11. Heat from the oil dissipates therefrom through the copper tubing 65 and through the fins 81 provided in the radiators 69, 71. Air circulating through the interior of the housing 21 is heated by the fins 81 and flows out of the outlet louvers 41. Thus, oil circulating through the tubing 65 is relatively cooler as it re-enters the motorcycle's engine 13 via the outlet portion 85 of the tubing 65 through the inlet hose 93.

It should be observed that the oil cooling apparatus 11 of the present invention is significantly less obtrusive than prior art cooling systems since it is mounted on the engine instead of on the motorcycle's frame. Also, the provision of two radiators enables the cooling apparatus 11 of the present invention to dissipate a greater amount of heat from oil flowing through the tubing than other prior art oil cooling systems.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An oil cooling apparatus for cooling oil contained in a motorcycle engine of a motorcycle, said apparatus comprising:

a housing having an interior defined by a front wall, a bottom wall extending rearwardly from the front wall, and a pair of spaced apart side walls which attach respective sides of the front and bottom walls, said housing further having an opening for accessing the interior of the housing, a plurality of inlet louvers formed in the front wall and a plurality of outlet louvers formed in the bottom wall, wherein air enters the interior of the housing via the inlet louvers and exits the interior of the housing via the outlet louvers;

means for mounting said housing on an engine of a motorcycle in a position such that the opening of the housing generally faces the engine; and means for cooling oil contained within the engine of the motorcycle comprising tubing in fluid communication with the engine whereby oil flows therethrough, and radiator means, disposed within said housing, for removing heat from the tubing, said tubing being disposed within said radiator means, wherein air, due to the flow of air into the housing via the inlet louvers and out of the housing via the outlet louvers, circulates within the interior of the housing around said radiator means for removing heat from said radiator means thereby cooling the oil flowing through the tubing.

2. The apparatus as set forth in claim 1, said radiator means comprising first and second radiators disposed within the interior of the housing.

3. The apparatus as set forth in claim 2, said first radiator being mounted on the bottom wall of the housing such that the first radiator lies generally along the same plane as the bottom wall and said second radiator extends from the first radiator in a plane generally along the same plane as the front wall.

4. The apparatus as set forth in claim 3, said second radiator being at an acute angle with respect to the first radiator.

5. The apparatus as set forth in claim 4, said second radiator being at a 56° angle with respect to the first radiator.

6. The apparatus as set forth in claim 3, said tubing being disposed within said first and second radiators such that an inlet portion of the tubing extends from the first radiator to the second radiator and an outlet portion of the tubing extends from the second radiator to the first radiator.

7. The apparatus as set forth in claim 6, said tubing comprising an inlet fitting for connecting the inlet portion of the tubing to a relatively short outlet hose of the engine and an outlet fitting for connecting the outlet portion of the tubing to a relatively short inlet hose of the engine, said outlet and inlet hoses of the engine being substantially concealed by the housing.

8. The apparatus as set forth in claim 7, said tubing including a loop of tubing in fluid communication with and disposed between the inlet and outlet portions of the tubing, said loop of tubing having a first section which extends from the second radiator to the first radiator and a second section which extends from the first radiator to the second radiator.

9. The apparatus as set forth in claim 8, said inlet portion, outlet portion, first section and second section of the tubing being bent at the junction of the first radiator and the second radiator.

10. The apparatus as set forth in claim 6, said first and second radiators each having a series of heat dissipating fins in contact with the tubing, said fins dissipating heat from the tubing as air flows within the interior of the housing from the inlet louvers to the outlet louvers.

11. The apparatus as set forth in claim 10, said heat dissipating fins being fabricated from sheet metal.

12. The apparatus as set forth in claim 1, said housing further comprising means, adjacent to said inlet louvers, for directing air into the interior of the housing.

13. The apparatus as set forth in claim 12, said directing means comprising, for each inlet louver, an inlet flap located above its respective inlet louver, said inlet flap being angled with respect to the front wall for directing air into the interior of the housing.

14. An oil cooling apparatus for cooling oil contained in a motorcycle engine of a motorcycle, said apparatus comprising:

a housing having an interior defined by a front wall, a bottom wall extending rearwardly from the front wall, and a pair of spaced apart side walls which attach respective sides of the front and bottom walls, said housing further having an opening for accessing the interior of the housing, a plurality of inlet louvers formed in the front wall and a plurality of outlet louvers formed in the bottom wall, wherein air enters the interior of the housing via the inlet louvers and exits the interior of the housing via the outlet louvers; and means for cooling oil contained within the engine of the motorcycle comprising tubing in fluid communication with the engine whereby oil flows therethrough, and radiator means, disposed within said housing, for removing heat from the tubing, said radiator means comprising a first radiator mounted on the bottom wall of the housing and a second radiator extending from the first radiator in a plane generally along the same plane as the front wall, said tubing being disposed within the first and second radiators, whereby air circulates within the interior of the housing due to the flow of air from the inlet louvers to the outlet louvers around the first and second radiators for removing heat from said radiators thereby cooling the oil flowing through the tubing.

15. The apparatus as set forth in claim 14, said tubing being disposed within the first and second radiators such that an inlet portion of the tubing extends from the first radiator to the second radiator and an outlet portion of the tubing extends from the second radiator to the first radiator.

16. The apparatus set forth in claim 15, said tubing comprising an inlet fitting for connecting the inlet portion of the tubing to an outlet hose of the engine and an outlet fitting for connecting the outlet portion of the tubing to an inlet hose of the engine, said outlet and inlet hoses of the engine being substantially concealed by the housing.

17. The apparatus as set forth in claim 16, said tubing including a loop of tubing in fluid communication with and disposed between the inlet and outlet portions of the tubing, said loop of tubing having a first section which extends from the second radiator to the first radiator and a second section which extends from the first radiator to the second radiator.

18. An oil cooling apparatus for cooling oil contained in a motorcycle engine of a motorcycle, said apparatus comprising:

a housing having an interior, an opening for accessing the interior, a plurality of inlet louvers formed in the housing, and a plurality of outlet louvers formed in the housing, wherein air enters the interior of the housing via the inlet louvers and exits the interior of the housing via the outlet louvers in order to circulate air throughout the interior of the housing; and means for cooling oil contained within the engine of the motorcycle comprising tubing in fluid communication with the engine whereby oil flows therethrough, and radiator means, disposed within and mounted on said housing, for removing heat from the tubing, wherein air circulates within the interior of the housing due to the flow of air from the inlet louvers to the outlet louvers around said radiator means for removing heat from said radiator means thereby cooling the oil flowing through the tubing.

* * * * *